United States Patent
Mannal et al.

(10) Patent No.: US 9,470,600 B2
(45) Date of Patent: Oct. 18, 2016

(54) METHOD FOR DIAGNOSING A DIFFERENTIAL PRESSURE SENSOR SITUATED IN AN AIR DUCT OF AN INTERNAL COMBUSTION ENGINE

(71) Applicant: Robert Bosch GmbH, Stuttgart (DE)

(72) Inventors: Soenke Mannal, Stuttgart (DE);
Berthold Burk, Ingersheim (DE);
Horst Mueller, Sachsenheim (DE);
Michael Bachner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/936,845

(22) Filed: Jul. 8, 2013

(65) Prior Publication Data
US 2014/0012457 A1    Jan. 9, 2014

(30) Foreign Application Priority Data
Jul. 9, 2012   (DE) .......................... 10 2012 211 904

(51) Int. Cl.
*G01L 27/00*        (2006.01)
(52) U.S. Cl.
CPC ................... *G01L 27/007* (2013.01)

(58) Field of Classification Search
USPC ........................................................ 701/29.7
See application file for complete search history.

(56) References Cited

U.S. PATENT DOCUMENTS

| | | | |
|---|---|---|---|
| 5,190,017 A * | 3/1993 | Cullen et al. ................. | 123/676 |
| 7,474,954 B1 * | 1/2009 | Zagone ......................... | 701/108 |
| 2007/0289302 A1 * | 12/2007 | Funke et al. .................... | 60/602 |
| 2009/0277431 A1 * | 11/2009 | Nitzke et al. ............ | 123/568.12 |
| 2010/0211293 A1 * | 8/2010 | Yamada et al. ............... | 701/108 |
| 2012/0297767 A1 * | 11/2012 | Hofbauer ................ | F02B 37/10 |
| | | | 60/605.2 |

* cited by examiner

*Primary Examiner* — John R Olszewski
*Assistant Examiner* — Jason Roberson
(74) *Attorney, Agent, or Firm* — Norton Rose Fulbright US LLP

(57) ABSTRACT

A method for diagnosing a differential pressure sensor situated in an air duct of an internal combustion engine, including: selecting a tolerance range for an output signal of the differential pressure sensor, within which a predetermined pressure difference is to be interpreted; and ignoring an error, in which the output signal of the differential pressure sensor falls out of the tolerance range, if, first of all, a predetermined operating situation prevails, in which the predetermined pressure difference is considered to be applied to the differential pressure sensor, and secondly, a disturbance pressure is detected in the air duct.

9 Claims, 2 Drawing Sheets

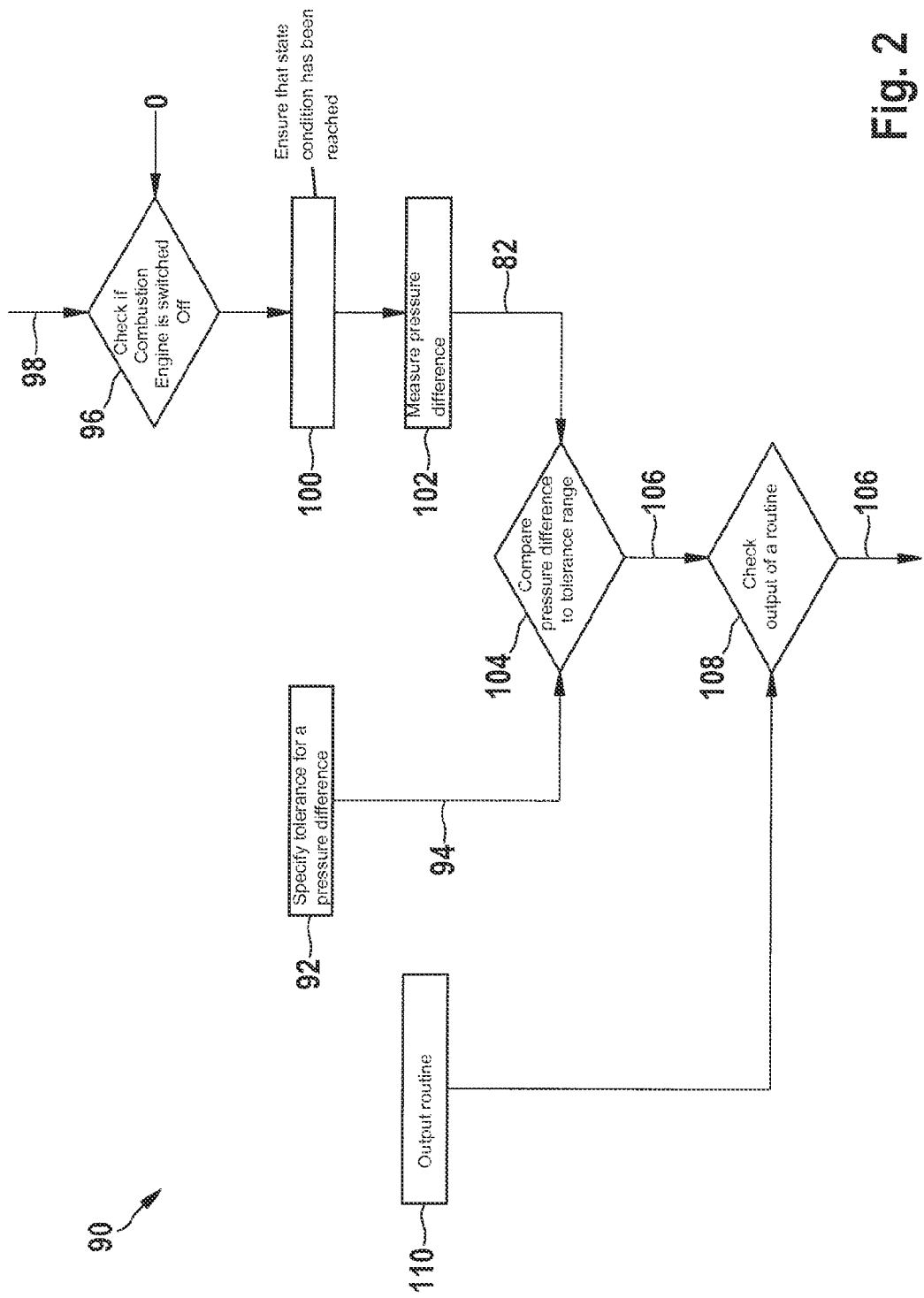

METHOD FOR DIAGNOSING A DIFFERENTIAL PRESSURE SENSOR SITUATED IN AN AIR DUCT OF AN INTERNAL COMBUSTION ENGINE

RELATED APPLICATION INFORMATION

The present application claims priority to and the benefit of German patent application no. 10 2012 211 904.3, which was filed in Germany on Jul. 9, 2012, the disclosure of which is incorporated herein by reference.

FIELD OF THE INVENTION

The present invention relates, in general, to vehicles having internal combustion engines, in particular, to differential pressure sensors in air supply systems of internal combustion engines. In addition, the present invention relates to methods for diagnosing differential pressure sensors installed in air ducts of internal combustion engines.

BACKGROUND INFORMATION

Differential pressure sensors installed in internal combustion engines are discussed in DE 10 2006 054 043 A1. Pressures are thermodynamic variables and may be used in internal combustion engines for temperature and/or mass flow rate measurements of gases flowing through a fresh-air intake system and/or through an exhaust-gas emissions system. These are used, as a rule, by a control device of the internal combustion engine, in order to inject an optimum fuel quantity into a combustion chamber of the internal combustion engine for a particular operating range of the internal combustion engine.

SUMMARY OF THE INVENTION

The present invention provides a method for diagnosing a differential pressure sensor situated in an air duct of an internal combustion engine, according to the description herein, as well as a control device and a vehicle having the control device, according to the other descriptions herein.

Refinements are indicated in the further descriptions herein.

According to one aspect of the present invention, a method for diagnosing a differential pressure sensor situated in an air duct of an internal combustion engine is specified, which includes the following steps:

selecting a tolerance range for an output signal of the differential pressure sensor, within which a predetermined pressure difference is to be interpreted; and ignoring an error, in which the output signal of the differential pressure sensor falls out of the tolerance range, if, first of all, a predetermined operating situation, in which the predetermined pressure difference is considered to be applied to the differential pressure sensor, is detected, and secondly, a disturbance pressure is detected in the air duct.

The specified method is based on the consideration that, as a rule, a sensor assigns a specific electrical signal to a physical variable to be measured, so that conversely, a value of the physical variable to be measured may be identified from the electrical signal output by the sensor. However, due to tolerances, which may be attributed, for example, to the measuring of the physical variable itself or the subsequent conditioning of the electrical signal, the sensor does not output a particular electrical signal value exactly for a particular value of the physical variable; rather, the electrical signal value lies within a particular tolerance range.

To check the reliability of the sensor, a specific value may be applied to the physical variable at the sensor, and it may be verified, whether or not the sensor outputs an electrical signal value expected for this specific value, within the tolerance range.

However, within the scope of the specified method, the present invention recognizes that a differential pressure sensor in an air duct of an internal combustion engine may be subjected to various disturbances. If the disturbance that affects the functioning of the differential pressure sensor is known and the disturbance can be eliminated, then the differential pressure sensor is not faulty. Therefore, any failed check of the reliability of the differential pressure sensor may be ignored.

In accordance with the specified method, errors of the differential pressure sensor may be ignored in any arbitrary manner. In this context, it is not necessary for the error itself to be measured. Thus, to be sure, the error may be measured and subsequently disregarded, but assuming the disturbance pressure is detected, it is also possible to simply not permit any check of the differential pressure sensor for an error.

In one particular further refinement of the specified method, the air duct is part of a low-pressure exhaust-gas recirculation duct in the internal combustion engine.

In one refinement of the specified method, the disturbance pressure is a negative pressure introduced into the air duct by an exhaust-gas suction system. Such a disturbance is only temporary and may be safely ruled out as an error of the differential pressure sensor, since as a rule, such a suction system is connected to the vehicle for testing purposes, for example, for an exhaust gas analysis. In this context, if the air duct is the low-pressure exhaust-gas recirculation duct in the internal combustion engine, then the negative pressure introduced by the suction system is applied directly to this low-pressure exhaust-gas recirculation duct, which means that this negative pressure falsifies the differential pressures in the low-pressure exhaust-gas recirculation duct to be measured by the differential pressure sensor for the time during the test with the suction system.

In another further refinement of the specified method, the disturbance pressure is applied to a further air duct, which branches off from the air duct, the disturbance pressure being present when the output signal changes with a degree of opening of an air duct branching off from the air duct. The degree of opening may be changed, for example, by control elements influencing a cross section of the air duct, such as valves or flaps. Particularly, the control element may be an exhaust flap, which is situated in an exhaust tract in the form of a further air duct.

Alternatively, the control element may also be a fresh-air throttle valve in front of a compressor or a three-way valve on an exhaust-gas or fresh-air side. The further refinement is based on the consideration that the above-mentioned negative pressure, which is applied to the air duct branching off from the air duct, is a function of the predetermined operating situation. Therefore, it does not matter if the internal combustion engine is running or stopped; when a disturbance pressure is present, in the case of a disturbance pressure applied to the further air duct, the differential pressure sensor would always have to measure a changing differential pressure in the air duct when the degree of opening of the further air duct is changed by the control element.

In this context, the differential pressure may decrease across a control element influencing the degree of opening of the air duct. In this case, the control element may be a valve or a flap.

In particular, the dependence of the output signal on the degree of opening of the air duct branching off from the air duct may be checked, using at least two different degrees of opening of the air duct versus the pressure difference to be measured, of completely open and completely closed. In the same manner, in the case of a completely open air duct, as well, no pressure may be built up in the air duct. Therefore, the air duct should be slightly closed, but still penetrable for a gas, which flows through the air duct and builds up the pressure.

In another further refinement, the predetermined operating situation, in which the predetermined pressure difference is considered to be applied to the differential pressure sensor, is present when the air duct is free of mass flow.

Consequently, no other pressures are built up in the air duct, so the predetermined pressure difference may be assumed to be zero. Then, this predetermined pressure difference of zero may only be changed from zero by the disturbance pressure.

In one particular further refinement, the air duct is considered to be free of mass flow, when a rotational speed of the internal combustion engine is zero. In this manner, the predetermined operating situation may be detected without further sensor-technology measures.

In one particular further refinement, the rotational speed of the internal combustion engine is considered to be zero, when the internal combustion engine has been stopped for a predefined period of time. In this manner, a steady-state condition of the air system of the internal combustion engine may be assumed, in which definitely no residual gases from a combustion chamber of the internal combustion engine are moved through the air duct.

According to a further aspect, a device, in particular, a processing unit, is provided for diagnosing a differential pressure sensor situated in an air duct of an internal combustion engine, the device being configured to:
  select a tolerance range for an output signal of the differential pressure sensor, within which a predetermined pressure difference is to be interpreted; and
  ignore an error, in which the output signal of the differential pressure sensor falls out of the tolerance range, if, first of all, a predetermined operating situation, in which the predetermined pressure difference is considered to be applied to the differential pressure sensor, is detected, and secondly, a disturbance pressure in the air duct is detected.

The specified device may be expanded as needed, such that it is able to implement one of the indicated methods according to the dependent claims.

In one further refinement of the present invention, the specified device has a memory and a processor. In this context, the specified method is stored in the memory in the form of a computer program, and the processor is provided for executing the method when the computer program is loaded from the memory into the processor.

According to a further aspect of the present invention, a vehicle includes a specified device.

The present invention also relates to a computer program having a program code arrangement, in order to carry out all of the steps of one of the specified methods, when the computer program is executed on a computer or one of the indicated devices.

The present invention also relates to a computer program product containing a program code, which is stored on a computer-readable storage medium, and which implements one of the specified methods, when it is executed on a data processing device.

Embodiments of the present invention are explained in greater detail in the following with reference to the accompanying drawings.

BRIEF DESCRIPTION OF THE DRAWINGS

FIG. 2 shows a flow chart of an exemplary embodiment of a specified method.

DETAILED DESCRIPTION

Figure 1:
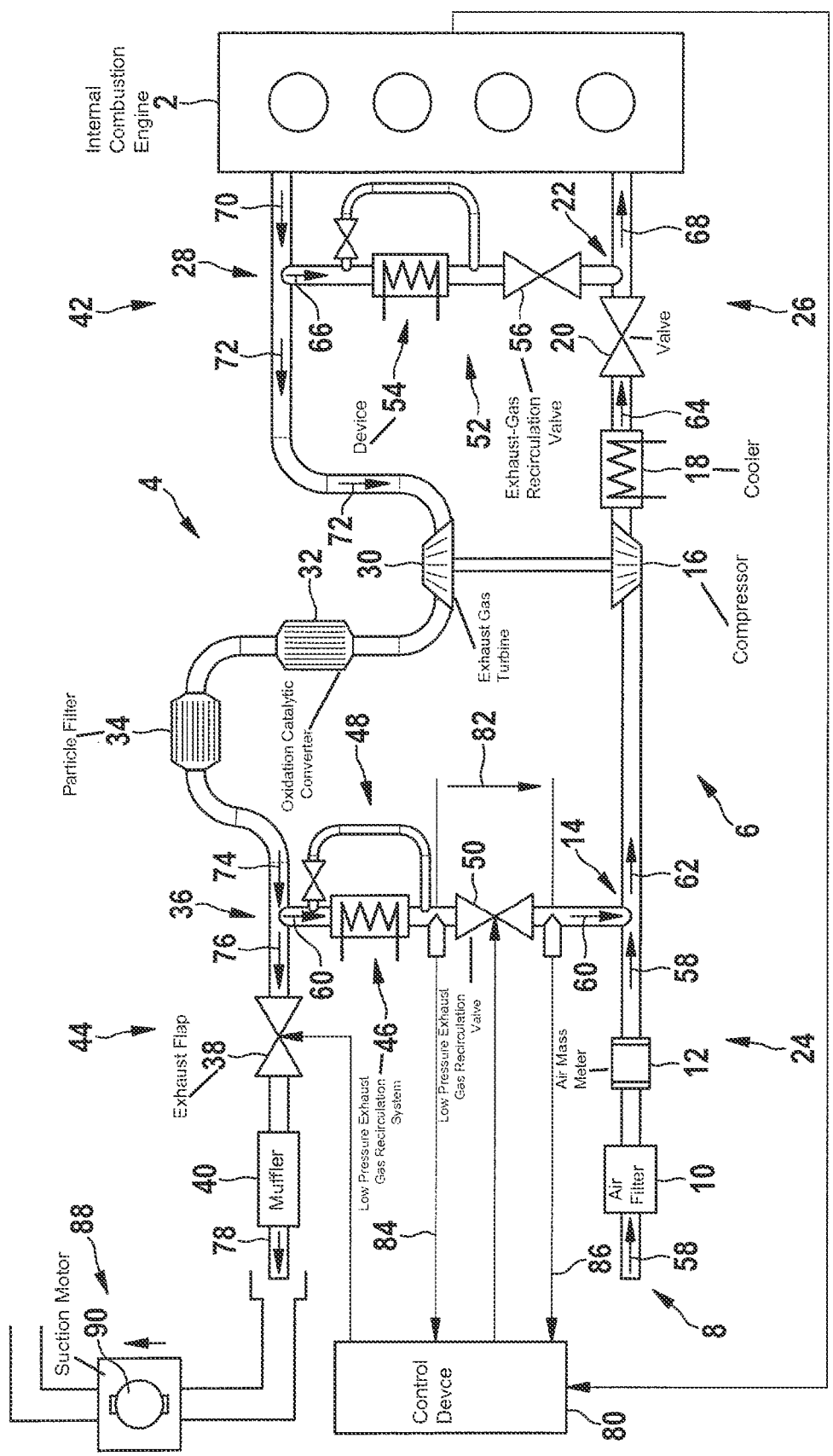
FIG. 1 shows a schematic representation of an internal combustion engine, which is supplied with fresh air by a fresh-air intake system and discharges combusted exhaust gas via an exhaust-gas emissions system.

In the figures, elements of the same or comparable function are provided with like reference numerals and described only once.

FIG. 1 shows an internal combustion engine 2 having an exhaust-gas emissions system 4 and a fresh-air intake system 6 for feeding fresh air into the internal combustion engine 2. In the drawing, fresh-air intake system 6 includes, as viewed from left to right, an air inlet 8, an air filter 10, a hot-film air mass flow meter 12, branching 14, a compressor 16, a cooler 18, a valve 20 and branching 22. In this context, an air path from air inlet 8 to compressor 16 denotes a first section 24, in which the fresh air has a comparatively low pressure, and an air path from compressor 16 to internal combustion engine 2 denotes a second section 26, in which the fresh air has a comparatively high pressure.

In the drawing, the exhaust-gas emissions system 4 in the upper region of FIG. 1 includes, from right to left, branching 28, an exhaust-gas turbine 30, an oxidation catalytic converter 32, a particle filter 34, branching 36, an exhaust flap 38 and a muffler 40. In this context, an exhaust-gas path from internal combustion engine 2 to exhaust-gas turbine 30 denotes a section 42, in which an exhaust gas has a comparatively high pressure, and an exhaust-gas path from exhaust-gas turbine 30 to muffler 40 denotes a section 44, in which an exhaust gas has a comparatively low pressure. It is clear that the pressure of the exhaust gas along section 44 may also be reduced in steps across exhaust-gas turbine 30, oxidation catalytic converter 32 and particle filter 34 in accordance with the flow resistances occurring in these elements.

In the left region of FIG. 1, a low-pressure exhaust-gas recirculation system 46 is situated between branching 36 of exhaust-gas emissions system 4 and branching 14 of fresh-air intake system 6. Low-pressure exhaust-gas recirculation system 46 includes a device 48, as well as a low-pressure exhaust-gas recirculation valve 50.

In the right region of FIG. 1, a high-pressure exhaust-gas recirculation system 52 is situated between branching 28 of exhaust-gas emissions system 4 and branching 22 of fresh-air intake system 6. High-pressure exhaust-gas recirculation system 52 includes a device 54 and a high-pressure exhaust-gas recirculation valve 56. Presently, devices 48 and 52 each include an exhaust-gas recirculation cooler, which has a bypass and a valve and is not explained in further detail.

During operation of internal combustion engine 2, low-pressure fresh air 58 flows through air filter 10 and hot-film air mass flow meter 12; at branching 14, the low-pressure fresh air being enriched with a low-pressure exhaust gas 60 recirculated via low-pressure exhaust-gas recirculation system 46. Enriched low-pressure fresh air 62 is compressed in compressor 16. In section 22, compressed, enriched low-pressure fresh air 64 is enriched with a recirculated high-pressure exhaust gas 66 and supplied to internal combustion engine 2 as high-pressure fresh air 68 for combusting a fuel.

As a result of the combustion, internal combustion engine 2 discharges a high-pressure exhaust gas 70, from which recirculated exhaust gas 66 is tapped in section 28. In the process, the amount of recirculated exhaust gas 66 is set, using high-pressure exhaust-gas recirculation valve 56. The rest 72 of high-pressure exhaust gas 70 is expanded in exhaust-gas turbine 30 to form a low-pressure exhaust gas 74. In section 36, recirculated low-pressure exhaust gas 60 is tapped from low-pressure exhaust gas 74, while the rest 76 of low-pressure exhaust gas 74 is discharged through an exhaust 78.

In the present variant, a control device 80 is connected to the internal combustion engine 2 having exhaust-gas emissions system 4 and fresh-air intake system 6. Control device 80 may be part of an engine control unit known to one skilled in the art, which controls the combustion in internal combustion engine 2. However, control device 80 may also be an extra diagnosing device, which makes reliability diagnoses at the components of the internal combustion engine 2 having exhaust-gas emissions system 4 and fresh-air intake system 6.

For example, control device 80 may be provided for measuring a pressure difference 82, which prevails across low-pressure exhaust-gas recirculation valve 50. Consequently, control device 80 is used as a measuring device. This is accomplished by measuring a pressure 84 of recirculated low-pressure exhaust gas 60 before low-pressure exhaust-gas recirculation valve 50 and a pressure 86 of recirculated low-pressure exhaust gas 60 after low-pressure exhaust-gas recirculation valve 50. The two measured pressures are subtracted from one another in control device 80, which results in the pressure difference 82 to be measured. At this point, it should be stressed that the present variant is purely exemplary, and that a pressure sensor could also perform the subtraction itself.

In order to diagnose if the measuring of differential pressure 82 also functions correctly, control device 80 may measure differential pressure 82 in a known operating state of internal combustion engine 2 and check if the measured differential pressure corresponds to an expected differential pressure.

In addition, the measurement of differential pressure 82 has proven to be particularly suitable, when internal combustion engine 2 is switched off and, therefore, no recirculated low-pressure exhaust gas 60 should be able to flow through low-pressure exhaust-gas recirculation valve 50. In this case, it is to be expected that differential pressure 82 is equal to zero. In order to take measuring errors and other fluctuations into account when measuring the differential pressure, a tolerance range may be defined, within which differential pressure 82 must lie when internal combustion engine 2 is switched off.

In FIG. 1, however, a situation is illustrated in which internal combustion engine 2 is connected to an exhaust-gas suction system 88. This exhaust-gas suction system 88 draws the rest 76 of low-pressure exhaust gas 74 from exhaust 78 via a suction motor 90 and, in this manner, introduces a pressure into exhaust-gas emissions system 4 that falsifies the measurement of differential pressure 82. In order to prevent the above-mentioned test, as to whether the measured differential pressure corresponds to the expected differential pressure, from producing an unintentional error message, then, in the present variant, it is proposed that any results of the test be discarded, or that the test simply not be conducted.

In order to determine if an exhaust-gas suction system 88 is connected to exhaust-gas emissions system 4, in the present variant, it is proposed that a time characteristic of differential pressure 82 be considered, when different control elements in the exhaust-gas emissions system are actuated.

Initially, by controlling low-pressure exhaust-gas recirculation valve 50, control device 80 ensures that differential pressure 82 may also decrease there. If low-pressure exhaust-gas recirculation valve 50 is completely open, differential pressure 82 may not be built up, which is why a position of low-pressure exhaust-gas recirculation valve 50 between slightly open and completely closed should be selected.

Subsequently, control device 80 varies the position of exhaust flap 38. In the case of a stopped engine 2 as the above-mentioned operating state, by varying the position of exhaust flap 38, no change in pressure difference 82 should be apparent, since no pressures can be built up in low-pressure exhaust-gas recirculation system 46. In contrast, these pressures are introduced into low-pressure exhaust-gas recirculation system 46 by exhaust-gas suction system 88, which is why the differential pressure also changes in response varying the position of exhaust flap 38. In this case, tests of functional capability of measuring the differential pressure should be disregarded or not conducted.

Reference is made to FIG. 2, which shows a flow chart of an exemplary embodiment of a specified method 90.

Initially, in step 92, a tolerance range 94 for pressure difference 82 is specified when internal combustion engine 2 is switched off.

In step 96, it is checked if internal combustion engine 2 is switched off, by checking if a rotational speed 98 of internal combustion engine 2 is equal to zero. If rotational speed 98 is equal to zero, then, in step 100, a predetermined period of time is allowed to elapse, in order to be certain that a steady-state condition at internal combustion engine 2 has been reached.

Subsequently, in step 102, pressure difference 82 is measured in the above-described manner and compared, in step 104, to tolerance range 94. If pressure difference 82 does not fall in tolerance range 94, an error 106 is generated, which is only output when, in the manner described above, no exhaust-gas suction system 88 is connected to exhaust 78. To that end, in step 108, the output of a routine 110, which determines, in the above-described manner, if exhaust-gas suction system 88 is connected to exhaust 78, is checked.

What is claimed is:

1. A method for diagnosing a differential pressure sensor, the method comprising:

selecting a tolerance range of predetermined values of a pressure difference that prevails across a low-pressure exhaust-gas recirculation valve for an output signal to be output by the differential pressure sensor when a predefined operating condition is present, wherein the differential pressure sensor is situated in a first air duct and the first air duct is located downstream of an exhaust-gas turbine with respect to an exhaust gas flow, as part of a low-pressure exhaust-gas recirculation system of an internal combustion engine, and the differential pressure sensor is configured to measure the pressure difference;

receiving the output signal output by the differential pressure sensor while the predefined operating condition is detected to be present; and ignoring an error, in which output signal falls out of the tolerance range, if, subsequent to the detection of the presence of the predefined operating condition, a disturbance pressure is detected in the first air duct;

wherein:
the predefined operating condition is present when the first air duct is free of mass flow and the rotational speed of the internal combustion engine is zero;
a source of the disturbance pressure is applied to a second air duct; and
the disturbance pressure is detected to be present when the output signal changes with a degree of opening of the second air duct.

2. The method of claim 1, wherein the disturbance pressure is a negative pressure introduced into the first air duct by an exhaust-gas suction system.

3. The method of claim 1, wherein the second air duct is located downstream of the exhaust-gas turbine with respect to the exhaust gas flow, as part of the low-pressure exhaust-gas recirculation system of the internal combustion engine.

4. The method of claim 3, wherein the output signal is measured for at least two different degrees of opening of the second air duct to determine whether the output signal is dependent upon the degree of opening of the second air duct, and wherein the at least two different degrees of opening are between completely open and completely closed.

5. The method of claim 1, wherein the rotational speed of the internal combustion engine is considered to be zero when the internal combustion engine has been stopped for a predetermined period of time.

6. A diagnosing device for diagnosing a differential pressure sensor, the diagnosing device comprising:
a processing arrangement configured to perform the following:
selecting a tolerance range of predetermined values of a pressure difference that prevails across a low-pressure exhaust-gas recirculation valve for an output signal to be output by the differential pressure sensor when a predefined operating condition is present, wherein the differential pressure sensor is situated in a first air duct and the first air duct is located downstream of an exhaust-gas turbine with respect to an exhaust gas flow, as part of a low-pressure exhaust-gas recirculation system of an internal combustion engine, and the differential pressure sensor is configured to measure the pressure difference;
receiving the output signal output by the differential pressure sensor while the predefined operating condition is detected to be present; and
ignoring an error, in which the output signal falls out of the tolerance range, if, subsequent to the detection of the presence of the predefined operating condition, a disturbance pressure is detected in the first air duct;
wherein:
the predefined operating condition is present when the first air duct is free of mass flow and the rotational speed of the internal combustion engine is zero;
a source of the disturbance pressure is applied to a second air duct; and
the disturbance pressure is detected to be present when the output signal changes with a degree of opening of the second air duct.

7. A vehicle, comprising:
a diagnosing device for diagnosing a differential pressure sensor, the diagnosing device including:
a processing arrangement configured to perform the following:
selecting a tolerance range of predetermined values of a pressure difference that prevails across a low-pressure exhaust-gas recirculation valve for an output signal to be output by the differential pressure sensor when a predefined operating condition is present, wherein the differential pressure sensor is situated in a first air duct and the first air duct is located downstream of an exhaust-gas turbine with respect to an exhaust gas flow, as part of a low-pressure exhaust-gas recirculation system of an internal combustion engine, and the differential pressure sensor is configured to measure the pressure difference;
receiving the output signal output by the differential pressure sensor while the predefined operating condition is detected to be present; and
ignoring an error, in which the output signal falls out of the tolerance range, if, subsequent to the detection of the presence of the predefined operating condition, a disturbance pressure is detected in the first air duct;
wherein:
the predefined operating condition is present when the first air duct is free of mass flow and the rotational speed of the internal combustion engine is zero; and
a source of the disturbance pressure is applied to a second air duct; and
the disturbance pressure is detected to be present when the output signal changes with a degree of opening of the second air duct.

8. A non-transitory computer readable medium having a computer program, which is executable by a processor and arranged in connection with the processor, which is communicatively coupled to a differential pressure sensor, the computer program comprising:
a program code arrangement having program code for diagnosing the differential pressure sensor situated in a first air duct, which is located downstream of an exhaust-gas turbine with respect to an exhaust gas flow, as part of a low-pressure exhaust-gas recirculation system of an internal combustion engine, and the differential pressure sensor is configured to measure a pressure difference that prevails across a low-pressure exhaust-gas recirculation valve, the diagnosing including performance of the following:
selecting a tolerance range of predetermined values of the pressure difference for an output signal to be output by the differential pressure sensor when a predefined operating condition is present;
receiving the output signal output by the differential pressure sensor while the predefined operating condition is detected to be present; and
ignoring an error, in which the output signal falls out of the tolerance range, if, subsequent to the detection of the presence of the predefined operating condition, a disturbance pressure is detected in the first air duct;
wherein:
the predefined operating condition is present when the first air duct is free of mass flow and the rotational speed of the internal combustion engine is zero; and
a source of the disturbance pressure is applied to a second air duct; and
the disturbance pressure is detected to be present when the output signal changes with a degree of opening of the second air duct.

9. The method of claim 1, wherein, when the predefined operating condition is present, the disturbance pressure is detected when any value of the measured differential pressure is not equal to zero.

* * * * *